United States Patent
Caillouette et al.

(10) Patent No.: US 10,731,052 B2
(45) Date of Patent: Aug. 4, 2020

(54) SYSTEM FOR FORMING ELASTOMERIC COMPOSITIONS FOR APPLICATION TO METAL

(71) Applicant: BASF SE, Ludwigshafen am Rhein (DE)

(72) Inventors: Lyle Caillouette, Farmington, MI (US); David R. Phelps, Ferndale, MI (US); Stephen Smith, Farmington Hills, MI (US); Karl Gust, Clawson, MI (US)

(73) Assignee: BASF SE, Ludwigshafen am Rhein (DE)

( * ) Notice: Subject to any disclaimer, the term of this patent is extended or adjusted under 35 U.S.C. 154(b) by 202 days.

(21) Appl. No.: 15/551,084

(22) PCT Filed: Feb. 10, 2016

(86) PCT No.: PCT/US2016/017324
§ 371 (c)(1),
(2) Date: Aug. 15, 2017

(87) PCT Pub. No.: WO2016/133758
PCT Pub. Date: Aug. 25, 2016

(65) Prior Publication Data
US 2018/0030309 A1    Feb. 1, 2018

Related U.S. Application Data

(60) Provisional application No. 62/116,687, filed on Feb. 16, 2015.

(51) Int. Cl.
*C08G 18/32* (2006.01)
*C08G 18/36* (2006.01)
(Continued)

(52) U.S. Cl.
CPC ......... *C09D 175/12* (2013.01); *C08G 18/168* (2013.01); *C08G 18/246* (2013.01);
(Continued)

(58) Field of Classification Search
CPC ... F16L 58/10; F16L 58/1054; F16L 58/1072; F16L 58/1081; F16L 58/109;
(Continued)

(56) References Cited

U.S. PATENT DOCUMENTS 4,555,536 A   11/1985  Maki et al.
4,582,891 A    4/1986  Maki et al.
(Continued)

FOREIGN PATENT DOCUMENTS

CN    101321798 A    12/2008
CN    101441817 A     5/2009
(Continued)

OTHER PUBLICATIONS

Office Action from counterpart Chinese Patent Appln. No. 201680021700.6 dated Apr. 12, 2019.
(Continued)

*Primary Examiner* — Lee E Sanderson
(74) *Attorney, Agent, or Firm* — DLA Piper LLP (US)

(57) ABSTRACT

A system for forming an elastomeric composition for application to a substrate includes an isocyanate component and an isocyanate-reactive component. The isocyanate component includes a polymeric polyisocyanate and optionally an isocyanate-terminated prepolymer. The isocyanate-reactive component is reactive with the isocyanate component and includes a polyol component and a polyetheramine. The polyol component is a mixture of (a) a hydrophobic polyol; (b) a polyether polyol different than the hydrophobic polyol and having a weight average molecular weight greater than 500 g/mol; and (c) a polyaminopolyol. The elastomeric
(Continued)

composition is formed as the reaction product of the isocyanate component and the isocyanate-reactive component and may be applied as an elastomeric coating layer on a substrate such as a steel pipe. The steel pipe having the applied elastomeric coating layer satisfies the standard for use in the water supply industry as set forth in AWWA C222.

25 Claims, 1 Drawing Sheet

(51) Int. Cl.
    *C08G 18/48*     (2006.01)
    *C08G 18/66*     (2006.01)
    *C09D 175/12*     (2006.01)
    *F16L 58/10*     (2006.01)
    *C08G 18/50*     (2006.01)
    *C08G 18/76*     (2006.01)
    *C08G 18/16*     (2006.01)
    *C08G 18/65*     (2006.01)
    *C08G 18/24*     (2006.01)
    *C09D 5/08*     (2006.01)

(52) U.S. Cl.
    CPC ......... *C08G 18/3284* (2013.01); *C08G 18/36* (2013.01); *C08G 18/48* (2013.01); *C08G 18/482* (2013.01); *C08G 18/4812* (2013.01); *C08G 18/4816* (2013.01); *C08G 18/4825* (2013.01); *C08G 18/4829* (2013.01); *C08G 18/4854* (2013.01); *C08G 18/5024* (2013.01); *C08G 18/6517* (2013.01); *C08G 18/6547* (2013.01); *C08G 18/6611* (2013.01); *C08G 18/6629* (2013.01); *C08G 18/6677* (2013.01); *C08G 18/6696* (2013.01); *C08G 18/7664* (2013.01); *C09D 5/08* (2013.01); *F16L 58/1027* (2013.01); *F16L 58/1072* (2013.01)

(58) Field of Classification Search
    CPC .............. C08G 18/5021; C08G 18/667; C08G 18/6677; C08G 18/16; C08G 18/18; C08G 18/166; C08G 18/168; C08G 18/48; C08G 18/4812; C08G 18/482; C08G 18/4825; C09D 175/12; C09D 175/08
    USPC ................. 428/36.9, 36.91; 528/60, 63, 74.5
    See application file for complete search history.

(56) References Cited

U.S. PATENT DOCUMENTS

| | | | |
|---|---|---|---|
| 5,290,632 A | | 3/1994 | Jadhav et al. |
| 5,340,900 A | * | 8/1994 | Spitzer ................. C08G 18/482 528/53 |
| 5,563,206 A | * | 10/1996 | Eicken ............... C08G 18/0804 524/590 |
| 5,688,860 A | * | 11/1997 | Croft .................. C08G 18/4054 524/710 |
| 2011/0098417 A1 | | 4/2011 | Worley et al. |

FOREIGN PATENT DOCUMENTS

| | | |
|---|---|---|
| CN | 102066446 A | 5/2011 |
| EP | 0 581 739 A1 | 2/1994 |
| EP | 0 648 237 A1 | 4/1995 |
| JP | H06-166811 A | 6/1994 |
| RU | 2471825 C1 | 1/2013 |
| RU | 2578206 C2 | 3/2016 |
| WO | WO 94/00504 A1 | 1/1994 |
| WO | 2007/078725 A1 | 7/2007 |
| WO | 2009/129393 A1 | 10/2009 |

OTHER PUBLICATIONS

International Search Report for Application No. PCT/US2016/017324 dated Apr. 22, 2016, 3 pages.
American Water Works Association, "AWWA Standard—Polyurethane Coatings for the Interior and Exterior of Steel Water Pipe and Fittings", Dec. 1, 2008, pp. 1-18.
BASF Corporation, "Elastocoat AC 74000 (Resin and Isocyanate)", Sep. 2014, 2 pages.
BASF Corporation, "Safety Data Sheet—Elastocoat AC 74000T Isocyanate", Sep. 2014, pp. 1-10.
BASF Corporation, "Safety Data Sheet—Elastocoat AC 74000R Resin", Sep. 2014, pp. 1-10.
BASF Corporation, "Material Application Guideline—Elastocoat AC 74000R Resin; Elastocoat AC 74000T Isocyanate", Sep. 2014, pp. 1-3.
BASF Corporation, "Technical Data Sheet—Elastocoat AC 74000", Jan. 2016, pp. 1-3.
English language abstract for EP 0 581 739 extracted from espacenet.com database on Aug. 17, 2017, 1 page.
English language abstract not found for EP 0 648 237; however, see International Publication WO 94/00504 and English language equivalent U.S. Pat. No. 5,688,860. Original document extracted from espacenet.com database on Aug. 17, 2017, 1 page.
Office Action from counterpart Kazakh Patent Appln. No. 2017/0766.1 dated Feb. 1, 2019, and its English Translation.
Notification of Reasons for Refusal from counterpart Japanese Patent Application No. 2017-543362 dated Nov. 25, 2019.
Office Action from counterpart Belarusian Patent Application No. a 2017 0341 dated Jan. 31, 2020, and English comments on the action.
Notification of Reasons for Refusal from counterpart Japanese Patent Application No. 2017-543362 dated Nov. 25, 2019, and its English translation.
Office Action from counterpart Brazilian Patent Application No. BR 11 2017 017456 1 dated Apr. 8, 2020, and English translation of relevant parts of the action.

* cited by examiner

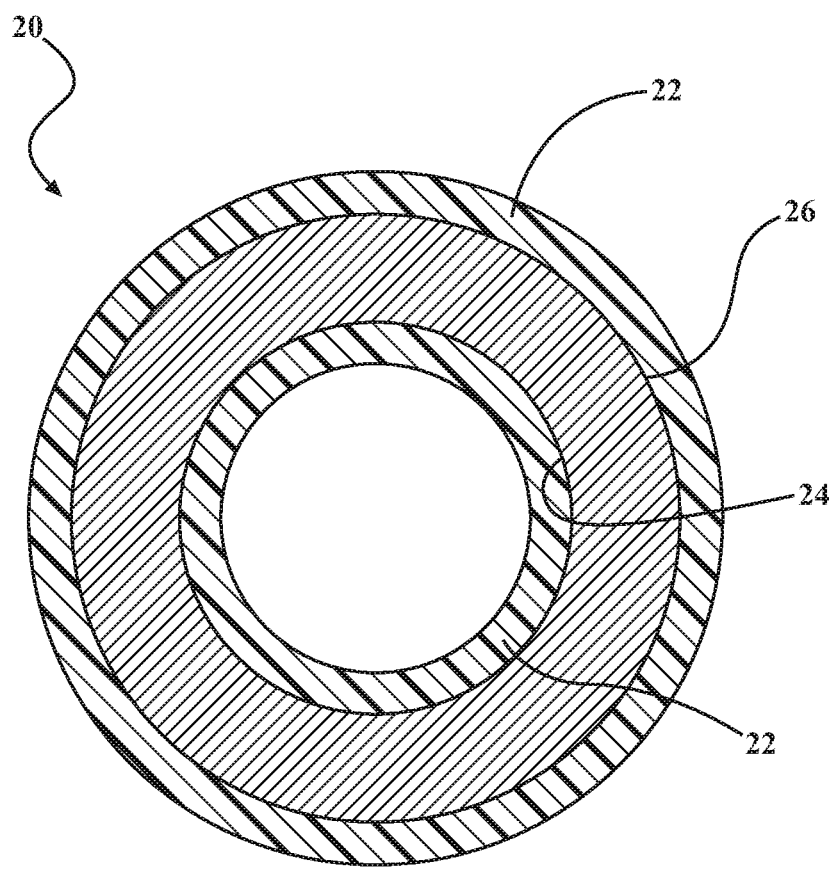

SYSTEM FOR FORMING ELASTOMERIC COMPOSITIONS FOR APPLICATION TO METAL

CROSS-REFERENCE TO RELATED APPLICATIONS

This application is the National Stage of International Patent Application No. PCT/US2016/017324, filed Feb. 10, 2016, which claims priority to U.S. Provisional Application No. 62/116,687, filed Feb. 16, 2015, the disclosure of which is specifically incorporated by reference in its entirety.

BACKGROUND OF THE INVENTION

1. Field of the Invention

The subject invention generally relates to a system for forming elastomeric compositions for application to metal.

2. Description of the Related Art

Metal piping is an essential part of the infrastructure of every city. It is used in a wide variety of circumstances, including both for interior and exterior use. Metal piping can be used for a wide variety of applications, including for use to transport drinking water to houses and businesses.

To protect these pipes against corrosion, anti-corrosive coating compositions are typically applied to its exposed outer surface and inner surface during manufacture. These coating compositions must therefore be capable of protecting the metal pipes from corrosion prior to, and after, installation. Still further, when used for metal pipes used for transporting drinkable water, these coating compositions must satisfy community standards for safety for use in the water supply industry. One standard used in the United States for polyurethane coating compositions for the interior and exterior of steel water pipe and fittings is American Water Works Association Specification C222 (ANSI/AWWA Standard C222, Standard for Polyurethane Coatings for the Interior and Exterior of Steel Water Pipe, and Fittings, Revision Effective Date: Dec. 1, 2008), hereinafter referred to as AWWA C222. AWWA C222 provides guidelines for minimum requirements for polyurethane lining and coating systems for the interior and exterior of steel water pipes, including coating materials, surface preparation, testing, handling, and packaging requirements.

SUMMARY OF THE INVENTION AND ADVANTAGES

The subject application provides a system for forming an elastomeric composition for application to a substrate that includes an isocyanate component and an isocyanate-reactive component.

The isocyanate component comprises a polymeric polyisocyanate and optionally an isocyanate-terminated prepolymer. The isocyanate-reactive component comprises a polyol component and a polyetheramine. The polyol component is a mixture of (a) a hydrophobic polyol; (b) a polyether polyol different than the hydrophobic polyol and having a weight average molecular weight greater than 500 g/mol; and (c) a polyaminopolyol.

The present invention also discloses an elastomeric composition formed as the reaction product of the isocyanate component and the isocyanate-reactive component.

The present invention also discloses a process for coating a substrate which includes applying a layer of the elastomeric composition onto a substrate.

Still further, the present invention also discloses articles including a substrate having the elastomeric coating layer, as described above, adhered thereon. In certain of these embodiments, the substrate is a metal pipe having an exterior surface and an interior surface, and the elastomeric composition is applied as a layer to at least one of the exterior surface and the interior surface.

The elastomeric coating layers formed from the system of the present invention are ideally suited for the protection of metal pipes against corrosion and abrasion. In particular, the elastomeric coating layers formed from the system of the present invention are ideally suited for protection of metal water pipes used in the water supply industry, in that the elastomeric coating layer for the steel pipe satisfies the requirements for elastomeric coating layers as described in American Water Works Association Specification C222.

BRIEF DESCRIPTION OF THE DRAWINGS

Other advantages of the present invention will be readily appreciated, as the same becomes better understood by reference to the following detailed description, when considered in connection with the accompanying drawing.

FIG. 1 is a cross-sectional view of a metal pipe having an elastomeric coating layer formed on an interior and an exterior surface.

DETAILED DESCRIPTION OF THE INVENTION

The system comprises an isocyanate component and an isocyanate-reactive component. The terminology "isocyanate-reactive component" may also be used interchangeably with "resin component" below in the description of the present invention.

In certain embodiments, the isocyanate component comprises a polymeric isocyanate, and optionally, an isocyanate-terminated prepolymer. The isocyanate-reactive component includes a polyol component and a polyetheramine. Typically, the system is provided in two or more discrete components, such as the isocyanate component and the isocyanate-reactive component, i.e., as a two-component (or 2K) system, which is described further below. Thus, as used herein, the term "system" may be used interchangeably with "two-component system" and interchangeably with "2K system."

It is to be appreciated that reference to the isocyanate and isocyanate-reactive components, as used herein, is merely for purposes of establishing a point of reference for placement of the individual components of the system, and for establishing a parts by weight basis. As such, it should not be construed as limiting the present invention to only a 2K system. For example, the individual components of the system can all be kept distinct from each other.

The system may also comprise additional components, which may be included with either one or both of the isocyanate and isocyanate-reactive components, or completely distinct, such as in a third component, as described further below.

The system is used to form an elastomeric composition. In certain embodiments, the elastomeric composition is the reaction product of the isocyanate component and the isocyanate-reactive components of the system.

The subject application also discloses the subsequent application of these elastomeric compositions as elastomeric coating layers on substrates, and in particular metal substrates. Relatedly, the subject application discloses the application of these elastomeric compositions as coating layers on articles such as metal pipes, wherein the coating layer on these articles provides these articles with desired protection from corrosion and external mechanical stress. In particular, the elastomeric composition forms hard, tough, and resilient elastomeric coating layers that are ideal for the protection of metal substrates and metal articles against corrosion and abrasion. The elastomeric coating layer, when applied to such steel pipes, is designed to satisfy the requirements of American Water Works Association Specification C222 for use in the water supply industry.

If employed, the isocyanate-terminated prepolymer is generally the reaction product of an isocyanate and a polyol and/or a polyamine, typically the reaction product of an isocyanate and a polyol. The isocyanate-terminated prepolymer can be formed by various methods understood by those skilled in the art or can be obtained commercially from a manufacturer, a supplier, etc.

With regard to the isocyanate used to form the isocyanate-terminated prepolymer, the isocyanate includes one or more isocyanate (NCO) functional groups, typically at least two NCO functional groups. Suitable isocyanates, for purposes of the present invention include, but are not limited to, conventional aliphatic, cycloaliphatic, aryl and aromatic isocyanates. In certain embodiments, the isocyanate is selected from the group of diphenylmethane diisocyanates (MDIs), polymeric diphenylmethane diisocyanates (PMDIs), and combinations thereof. Polymeric diphenylmethane diisocyanates are also referred to in the art as polymethylene polyphenylene polyisocyanates. Examples of other suitable isocyanates, for purposes of the present invention include, but are not limited to, toluene diisocyanates (TDIs), hexamethylene diisocyanates (HDIs), isophorone diisocyanates (IPDIs), naphthalene diisocyanates (NDIs), and combinations thereof. Typically, the isocyanate used to form the isocyanate-terminated prepolymer comprises diphenylmethane diisocyanate (MDI).

If employed to form the isocyanate-terminated prepolymer, the polyol includes one or more hydroxyl (OH) functional groups, typically at least two OH functional groups. The polyol can be any type of polyol known in the art. The polyol is typically selected from the group of ethylene glycol, diethylene glycol, propylene glycol, dipropylene glycol, butanediol, glycerol, trimethylolpropane, triethanolamine, pentaerythritol, sorbitol, and combinations thereof. Other suitable polyols, for purposes of the present invention, are described below with description of an additional, optional, component, a supplemental polyol.

The polyol can be used in various amounts relative to the isocyanate, as long as an excess of NCO functional groups relative to OH functional groups are present prior to reaction such that the isocyanate-terminated prepolymer, after formation, includes NCO functional groups for subsequent reaction. The isocyanate-terminated prepolymer typically has an NCO content of from about 18 to about 28, more typically from about 20 to about 25, and yet more typically about 22.9, wt. %. NCO content can be determined as the amount of isocyanate which combines with 1 equivalent of n-dibutylamine, which is measure in terms of weight percent.

If employed to form the isocyanate-terminated prepolymer, the polyamine includes one or more amine functional groups, typically at least two amine functional groups. The polyamine can be any type of polyamine known in the art. The polyamine is typically selected from the group of ethylene diamine, toluene diamine, diaminodiphenylmethane and polymethylene polyphenylene polyamines, aminoalcohols, and combinations thereof. Examples of suitable aminoalcohols include ethanolamine, diethanolamine, triethanolamine, and combinations thereof.

The polyamine can be used in various amounts relative to the isocyanate, as long as an excess of NCO functional groups relative to amine functional groups are present prior to reaction such that the isocyanate-terminated prepolymer, after formation, includes NCO functional groups for subsequent reaction. The NCO content of the isocyanate-terminated prepolymer is as described and exemplified above.

It is to be appreciated that the isocyanate-terminated prepolymer may be formed from a combination of two or more of the aforementioned polyols and/or two or more of the aforementioned polyamines. Typically, the isocyanate-terminated prepolymer is a reaction product of the isocyanate and at least one polyol such that the isocyanate-terminated prepolymer includes urethane linkages and NCO functional groups after formation. In a specific embodiment of the present invention, the isocyanate-terminated prepolymer comprises a blend of polymeric methyldiphenyldiisocyanate and quasi-prepolymers of 4,4'-methyldiphenyldiisocyanate. Specific examples of suitable isocyanate-terminated prepolymers, for purposes of the present invention, are commercially available from BASF Corporation of Florham Park, N.J., under the trademark LUPRANATE®, such as LUPRANATE® MP102. It is to be appreciated that the system can include a combination of two or more of the aforementioned isocyanate-terminated prepolymers.

With regard to the polymeric isocyanate, the polymeric isocyanate includes two or more NCO functional groups. The polymeric isocyanate typically has an average functionality of from about 1.5 to about 3.0, more typically from about 2.0 to about 2.8, and yet more typically about 2.7. The polymeric isocyanate typically has an NCO content of from about 30 to about 33, more typically from about 30.5 to about 32.5, and yet more typically about 31.5, wt. %.

Suitable polymeric isocyanates, for purposes of the present invention include, but are not limited to, the isocyanates described and exemplified above for description of the isocyanate-terminated prepolymer. Typically, the polymeric isocyanate comprises polymeric diphenylmethane diisocyanate (PMDI).

Specific examples of suitable polymeric isocyanates, for purposes of the present invention, are commercially available from BASF Corporation under the trademark LUPRANATE®, such as LUPRANATE® M20 Isocyanate, and sold under the trademark ELASTOFLEX®, such as ELASTOFLEX® R23000 (having a nominal, or average, functionality of 2.7). It is to be appreciated that the system can include a combination of two or more of the aforementioned polymeric isocyanates.

The isocyanate-terminated prepolymer is typically present in the isocyanate component in an amount of from about 25 to about 75, more typically from about 50 to about 75, yet more typically from about 55 to about 65, and yet even more typically about 60, parts by weight, each based on 100 parts by weight of the isocyanate component. In certain embodiments, the isocyanate-terminated prepolymer is typically present in the system in an amount of from about 50 to about 250, more typically from about 100 to about 200, yet more typically from about 125 to about 175, and yet even more typically about 150, parts by weight, each per 100 parts by weight of the polymeric isocyanate in the system. Said another way, the isocyanate-terminated prepolymer and the polymeric isocyanate are typically present in the system, e.g. in the isocyanate component, in a weight ratio of from about 1:2 to about 2.5:1, more typically from about 1:1 to about 2:1, yet more typically from about 1.25:1 to 1.75:1, and yet even more typically about 1.5:1.

Without being bound or limited to any particular theory, it is believed that the combination and ratios of the isocyanate-terminated prepolymer and the polymeric isocyanate, as described and exemplified immediately above, imparts the elastomeric composition with increased tensile strength, elongation, hardness, and glass transition temperature, as well as improved tear strength relative to conventional elastomeric compositions.

The isocyanate component, which comprises the polymeric isocyanate and optionally the isocyanate-terminated prepolymer, is typically present in an amount of from 35.5 to 40 parts, based on 100 parts, of the system. Stated another way, the isocyanate component comprises from 35.5 to 40 weight percent of the total weight of the system.

The system, as noted above, also includes an isocyanate-reactive component that is reactive with the isocyanate component to form an elastomeric composition. In certain embodiments, the isocyanate-reactive component comprises a polyol component and a polyetheramine.

In certain embodiments, the polyol component includes unreacted hydroxyl groups and comprises a mixture of (a) a hydrophobic polyol, (b) a polyether polyol different than the hydrophobic polyol (a) and having a weight average molecular weight greater than 500; and (c) a polyaminopolyol.

With regard to the hydrophobic polyol (a), the hydrophobic polyol includes one or more OH functional groups, typically at least two OH functional groups. Hydrophobicity of the hydrophobic polyol can be determined by various methods, such as by visual inspection of the reaction product of the hydrophobic polyol with isocyanate where the reaction product has been immediately de-gassed after mixing the two components and then introduced into water, where the reaction product is allowed to cure. If there is no evidence of marring or wrinkling at the interface (or surface) between the reaction product and the water, or if there is no evidence of bubble or foam formation, hydrophobicity of the hydrophobic polyol is considered excellent.

The hydrophobic polyol typically comprises a natural oil polyol (NOP). In other words, the hydrophobic polyol is typically not a petroleum-based polyol, i.e., a polyol derived from petroleum products and/or petroleum by-products. In general, there are only a few naturally occurring vegetable oils that contain unreacted OH functional groups, and castor oil is typically the only commercially available NOP produced directly from a plant source that has sufficient OH functional group content to make castor oil suitable for direct use as a polyol in urethane chemistry. Most, if not all, other NOPs require chemical modification of the oils directly available from plants. The NOP is typically derived from any natural oil known in the art, typically derived from a vegetable or nut oil. Examples of suitable natural oils, for purposes of the present invention, include castor oil, and NOPs derived from soybean oil, rapeseed oil, coconut oil, peanut oil, canola oil, etc. Employing natural oils can be useful for reducing environmental footprints.

Typically, as alluded to above, the hydrophobic polyol comprises castor oil, and in certain embodiments purified castor oil which has been purified to remove residual water. As referred to hereinafter, the term "castor oil" refers to both unpurified and purified castor oil. Those skilled in the art appreciate that castor oil inherently includes OH functional groups whereas other NOPs may require one or more additional processing steps to obtain OH functional groups. In general, neither castor oil, nor NOPs processed to include OH functional groups, includes ether groups. Such processing steps, if necessary, are understood by those skilled in the art. Suitable grades of castor oil, for purposes of the present invention, are commercially available from a variety of suppliers. For example, T31® Castor Oil, from Eagle Specialty Products (ESP) Inc. of St. Louis, Mo., can be employed as the hydrophobic polyol. Specific examples of other suitable hydrophobic polyols, for purposes of the present invention, are commercially available from BASF Corporation under the trademark SOVERMOL®, such as SOVERMOL® 750, SOVERMOL® 805, SOVERMOL® 1005, SOVERMOL® 1080, and SOVERMOL® 1102.

In certain embodiments, the hydrophobic polyol, such as purified castor oil, is present in the system in an amount of from about 27 to about 35 weight percent, such as from 29 to 30 weight percent, based upon the total weight of the system.

The polyol component also includes at least one polyether polyol (b) different than the hydrophobic polyol (a). The polyether polyol (b) has a weight average molecular weight of at least 500 g/mol. The polyether polyol (b) of the present invention is believed to increase the homogeneity of the isocyanate-reactive component with the isocyanate component and other additional components or additives in the system.

Suitable polyether polyols, for purposes of the present invention include, but are not limited to, products obtained by the polymerization of a cyclic oxide, for example ethylene oxide (EO), propylene oxide (PO), butylene oxide (BO), or tetrahydrofuran in the presence of polyfunctional initiators. Suitable initiator compounds contain a plurality of active hydrogen atoms, and include water, butanediol, ethylene glycol, propylene glycol (PG), diethylene glycol, triethylene glycol, dipropylene glycol, ethanolamine, diethanolamine, triethanolamine, toluene diamine, diethyl toluene diamine, phenyl diamine, diphenylmethane diamine, ethylene diamine, cyclohexane diamine, cyclohexane dimethanol, resorcinol, bisphenol A, glycerol, trimethylolpropane, 1,2,6-hexanetriol, pentaerythritol, and combinations thereof.

Other suitable polyether polyols include polyether diols and triols, such as polyoxypropylene diols and triols and poly(oxyethylene-oxypropylene)diols and triols obtained by the simultaneous or sequential addition of ethylene and propylene oxides to di- or trifunctional initiators. Copolymers having oxyethylene contents of from about 5 to about 90% by weight, based on the weight of the polyol component, of which the polyols may be block copolymers, random/block copolymers or random copolymers, can also be used. Yet other suitable polyether polyols include polytetramethylene ether glycols obtained by the polymerization of tetrahydrofuran.

In certain embodiments, the polyether polyol (b) is a product formed in the absence of, or substantially in the absence of, ethylene oxide, as ethylene oxide are believed to increase the hydrophilicity of elastomeric compositions in which it is utilized. In certain embodiments, the polyether polyol (b) is a product formed by the polymerization of propylene oxide.

Still further, in certain embodiments, the polyether polyol (b) of the present invention has a weight average molecular weight of from 500 to 650 g/mol, such as 569 g/mol.

In addition, in certain embodiments, the polyether polyol (b) of the present invention has an average functionality of from 3.5 to 4, such as 3.96.

Still further, in certain embodiments, the polyether polyol (b) is a product obtained by the polymerization of propylene oxide, in the absence of ethylene oxide, has a weight average molecular weight of from 500 to 650 g/mol, and has an average functionality from 3.5 to 4.0.

One suitable polyether polyol (b), obtained by the polymerization of propylene oxide and having a molecular weight of 569 g/mol and an average functionality of 3.96, is commercially available as PLURACOL® P-736 from BASF Corporation.

In certain embodiments, the polyether polyol (b) obtained by the polymerization of propylene oxide is present amount of from 1.8 to 5 weight percent, such as from 2 to 3 weight percent, such as 2.5 weight percent, based on the total weight of the system.

In certain other embodiments, the isocyanate-reactive component also includes a polytetramethylene ether glycol, or polyetherol, obtained by the polymerization of tetrahydrofuran.

In certain embodiments, the polytetramethylene ether glycol has a weight average molecular weight of from 650 to 2000 g/mol, such as a weight average molecular weight of 1000 g/mol, and is believed to provide increased impact resistance of the resultant elastomeric composition due to its higher relative molecular weight.

One suitable polytetramethylene ether glycol is commercially available as PolyTHF® Polyether Diol 1000 from BASF Corporation.

Still further, in certain embodiments, the polytetramethylene ether glycol is present in the system an amount of from 4 to 10 weight percent, such as from 5 to 8 weight percent, such as 7.5 weight percent, based on the total weight of the system.

The polyaminopolyol (c) used in the present invention is a compound including both hydroxyl functionality and amine functionality and is added to the system to provide increased hardness due to its lower relative molecular weight.

In certain embodiments, the polyaminopolyol is diamine. In still further embodiments, the polyaminopolol is an ethylene diamine and propylene oxide based polyether polyol tetrol.

In certain embodiments, the polyaminopolyol has a weight average molecular weight of from 280 to 310 g/mol, such as from 290 to 300 g/mol.

In still further embodiments, the polyaminopolyol is present in the system in an amount of from 4 to 10 weight percent, such as from 5 to 8 weight percent, such as 7.5 weight percent, based on the total weight of the system.

One suitable polyaminopolyol (c) for the subject application is an ethylene diamine and propylene oxide based polyether polyol tetrol, commercially available from Carpenter and sold under the tradename Carpol EDAP-770 (also alternatively referred to as Quadrol or POLY EDA 770), having a weight average molecular weight of about 290-295.

The isocyanate-reactive component also includes a polyetheramine, which is added to the system to provide the formed elastomeric compositions with increased impact resistance due at least in part to its higher relative molecular weight.

In certain embodiments, the polyetheramine (d) is a polyetherdiamine.

Still further, in certain embodiments, the polyetheramine (d) has a weight average molecular weight of from 1000 to 3000 g/mol, such as 1500 to 2500 g/mol, such as 2000 g/mol.

In still further embodiments, the polyetherdiamine (d) is present in the system in an amount of from 4 to 10 weight percent, such as from 5 to 8 weight percent, such as 7.5 weight percent, based on the total weight of the system.

One suitable polyetheramine for the subject application is alpha-(2-aminomethylethyl)-omega-(2-aminomethylethoxy)-poly(oxy(methyl-1,2-ethanediyl)), having an amine number from 53.3 to 58.9 mg KOH/g, and sold commercially under the tradename Polyetheramine D 2000 from BASF Corporation.

The system may include one or more additional components, such as an additive component. The additive component may comprise any conventional additive known in the art. Suitable additives, for purposes of the present invention include, but are not limited to, chain-extenders, cross-linkers, chain-terminators, processing additives, adhesion promoters, flame retardants, anti-oxidants, defoamers, antifoaming agents, water scavengers, molecular sieves, fumed silicas, ultraviolet light stabilizers, fillers, thixotropic agents, silicones, surfactants, catalysts, colorants, inert diluents, and combinations thereof. If employed, the additive component may be included in the system any amount, such as from about 0.05 to 10 parts by weight based on 100 parts by weight of the isocyanate-reactive component of the system.

In certain embodiments, the additive component comprises an antifoaming agent. In one embodiment, the antifoaming agent comprises a silicone fluid including powdered silica dispersed therein. The silicone fluid can be employed to reduce and/or eliminate foaming of the elastomeric composition. It should be appreciated that the silicone fluid may be predisposed in a solvent. Examples of antifoaming agents include Antifoam MSA and Antifoam A, commercially available from Dow Corning of Midland, Mich.

If employed, the antifoaming agent is typically present in the system in an amount of from about 0.01 to about 0.10, more typically from about 0.025 to about 0.075, and yet more typically about 0.05, parts by weight, each based on 100 parts by weight of the isocyanate-reactive component of the system. It is to be appreciated that the system may include any combination of two or more of the aforementioned antifoaming agents.

In certain embodiments, the additive component comprises a molecular sieve. The molecular sieve is a hygroscopic agent that can be employed to maintain or increase desiccation, i.e., a state of dryness. The molecular sieve typically comprises molecules having a plethora of small pores. The small pores allow for molecules having a size smaller than the pores, such as water molecules, to be adsorbed while larger molecules, such as those present in the isocyanate and isocyanate-reactive component, cannot be adsorbed. Typically, the molecular sieve can adsorb water up to and in excess of 20% of the weight of the molecular sieve. The molecular sieve, therefore, can act synergistically and in concert with the hydrophobic polyol to minimize the effect of water on the elastomeric composition by adsorbing water before the water has a chance to react with the isocyanate component of the system.

If employed, it should be appreciated that any molecular sieve known in the art can be used, such as aluminosilicate minerals, clays, porous glasses, microporous charcoals, zeolites, active carbons, or synthetic compounds that have open structures through which small molecules, e.g. water, can diffuse. Examples of suitable molecular sieves include Baylith Paste and Molecular Sieve 3A, which are available from a variety of suppliers, such as Zeochem of Louisville, Ky.

If employed, the molecular sieve is typically present in the system in an amount of from about 0.01 to about 5.0, more typically from about 0.10 to about 2.5, and yet more typically about 1.25 weight percent of the total weight of the system. It is to be appreciated that the system may include any combination of two or more of the aforementioned molecular sieves.

In certain embodiments, the additive component comprises fumed silica, which is commercially available from a variety of suppliers. An example of suitable fumed silica is AEROSIL® R-972, commercially available from Evonik Industries Inc. of Essen, Germany. Fumed silica generally acts as a rheology control agent, and, if the fumed silica is hydrophobic, it imparts additional hydrophobicity to the elastomeric composition.

If employed, the fumed silica is typically present in the system in an amount of from about 0.10 to about 10.0, more typically from about 0.5 to about 2.5, and yet more typically about 1.25 weight percent of the total weight percent of the system. It is to be appreciated that the system may include any combination of two or more fumed silicas.

In certain embodiments which include both molecular sieves and fumed silica, these components are combined with the hydrophobic polyol to form a paste that is mixed together prior to the hydrophobic polyol being mixed with the remainder of the isocyanate-reactive components.

In certain embodiments, the additive component comprises a colorant. The colorant can be selected from the group of pigments, dyes, and combinations thereof. The colorant can be in either liquid or powder form. If employed, the colorant is typically a pigment or a pigment blend of two or more pigments. The pigment, or pigment blend, is used to impart a desired color to the elastomeric composition and, if the pigment is inorganic, the pigment can also impart UV protection to the elastomeric composition.

Different types of pigments can be used for purposes of the present invention. For example, titanium dioxide can be used to impart a white color and carbon black can be used to impart a black color, to the elastomeric composition, respectively, while various blends of titanium dioxide and carbon black can be used to impart various shades of gray to the elastomeric composition.

Examples of suitable grades of carbon black and titanium dioxide for purposes of the present invention are commercially available from Columbian Chemicals Company of Marietta, Ga., DuPont® Titanium Technologies of Wilmington, Del. and Repi S.p.A, respectively. Other pigments including, but not limited to, red, green, blue, yellow, green, and brown, and pigment blends thereof, can also be used to impart color to the elastomeric composition in addition to or alternative to carbon black and/or titanium dioxide.

More specific examples of colors, based on one or more colorants, include sapphire blue, jade green, Sedona red, amber brown, and topaz brown. Examples of suitable grades of pigments for purposes of the present invention are commercially available from various companies such as BASF Corporation and Penn Color, Inc. of Hatfield, Pa. It is to be appreciated that various blends of the aforementioned colorants, e.g. pigments, can be used to impart the elastomeric composition with various colors, strengths, and shades.

If employed, the colorant is typically present in the system in an amount of from about 0.10 to about 5.0, more typically from about 0.5 to 2.0, and yet more typically about 0.6 weight percent of the total weight of the system. It is to be appreciated that the system may include any combination of two or more of the aforementioned colorants.

In certain embodiments, the additive component comprises a catalyst component. In one embodiment, the catalyst component comprises a tin catalyst. Suitable tin catalysts, for purposes of the present invention, include tin(II) salts of organic carboxylic acids, e.g. tin(II) acetate, tin(II) octoate, tin(II) ethylhexanoate and tin(II) laurate. In one embodiment, the organometallic catalyst comprises dibutyltin dilaurate, which is a dialkyltin(IV) salt of an organic carboxylic acid. Specific examples of suitable organometallic catalyst, e.g. dibutyltin dilaurates, for purposes of the present invention, are commercially available from Air Products and Chemicals, Inc. of Allentown, Pa., under the trade name DABCO®. The organometallic catalyst can also comprise other dialkyltin(IV) salts of organic carboxylic acids, such as dibutyltin diacetate, dibutyltin maleate and dioctyltin diacetate.

Examples of other suitable catalysts, for purposes of the present invention, include amine-based catalysts, bismuth-based catalysts, nickel-base catalysts, zirconium-based catalysts, zinc-based catalysts, aluminum-based catalysts, lithium-based catalysts, iron(II) chloride; zinc chloride; lead octoate; tris(dialkylaminoalkyl)-s-hexahydrotriazines including tris(N,N-dimethylaminopropyl)-s-hexahydrotriazine; tetraalkylammonium hydroxides including tetramethylammonium hydroxide; alkali metal hydroxides including sodium hydroxide and potassium hydroxide; alkali metal alkoxides including sodium methoxide and potassium isopropoxide; and alkali metal salts of long-chain fatty acids having from 10 to 20 carbon atoms and/or lateral OH groups.

Further examples of other suitable catalysts, specifically trimerization catalysts, for purposes of the present invention, include N,N,N-dimethylaminopropylhexahydrotriazine, potassium, potassium acetate, N,N,N-trimethyl isopropyl amine/formate, and combinations thereof. A specific example of a suitable trimerization catalyst is commercially available from Air Products and Chemicals, Inc. under the trade name POLYCAT®.

Yet further examples of other suitable catalysts, specifically tertiary amine catalysts, for purposes of the present invention, include 1-methylimmidazol, DABCO 33-LV, dimethylaminoethanol, dimethylaminoethoxyethanol, triethylamine, N,N,N',N'-tetramethylethylenediamine, N,N-dimethylaminopropylamine, N,N,N',N',N''-pentamethyldipropylenetriamine, tris(dimethylaminopropyl)amine, N,N-dimethylpiperazine, tetramethylimino-bis(propyl amine), dimethylbenzylamine, trimethylamine, triethanolamine, N,N-diethyl ethanolamine, N-methylpyrrolidone, N-methylmorpholine, N-ethylmorpholine, bis(2-dimethylaminoethyl)ether, N,N-dimethylcyclohexylamine (DMCHA), N,N,N',N',N''-pentamethyldiethylenetriamine, 1,2-dimethylimidazole, 3-(dimethylamino) propylimidazole, and combinations thereof. Specific examples of suitable tertiary amine catalysts are commercially available from Air Products and Chemicals, Inc. under the trade name POLYCAT®, e.g. POLYCAT® 41.

If employed, the catalyst component can be employed in various amounts. Typically, the catalyst component is used in an amount to ensure adequate open/working time. It is to be appreciated that the catalyst component may include any combination of the aforementioned catalysts.

As described above, in certain embodiments, the elastomeric composition comprises the reaction product of the isocyanate-terminated prepolymer, the polymeric isocyanate, and the isocyanate-reactive component.

The present invention further provides a method of forming the elastomeric composition. The method comprises the steps of providing the isocyanate-terminated prepolymer, the polymeric isocyanate, and the isocyanate-reactive component and forming the elastomeric coating as the reaction product thereof.

The isocyanate index (NCO Index) of the resultant elastomeric composition of the present invention ranges from about 98 to 115, such as from 100 to about 110, more typically from about 100 to about 107, such as 103. In other words, the molar amount of unreacted NCO groups in the isocyanate component, relative to the molar amount of active hydrogen atoms contributed by the hydroxyl groups and amine groups present in the isocyanate-reactive component, is typically set in the system such that there is a slight stoichiometric excess of unreacted NCO groups in the isocyanate component relative to unreacted hydroxyl groups in the polyol component (i.e., the NCO:OH molar ratio of the system ranges from 0.98:1 to 1.15:1, such as from 1:1 to 1.10:1, such as from 1:1 to 1.07:1, such as 1.03:1). In the typical embodiments, this slight NCO excess allows the residual unreacted NCO groups in the formed elastomeric composition to react with moisture to promote further curing of the elastomeric composition upon or after application as an elastomeric coating layer to its desired metal substrate. An upper limit of 1.15:1 therein prevents the elastomeric coating from becoming too brittle.

The elastomeric composition may be referred to in the art as a 2K elastomeric polyurethane composition. The isocyanate and isocyanate-reactive components are mixed to form the reaction product of the elastomeric composition. The term "reaction product" as used herein is intended to encompass all stages of interaction and/or reaction between the isocyanate and isocyanate-reactive components. Generally, the reaction product begins to form when the isocyanate and isocyanate-reactive components come into contact with each other.

When the elastomeric composition is sprayed, it should be appreciated that the isocyanate component and the isocyanate-reactive component may be mixed before or after exiting a nozzle of the sprayer. In one embodiment, the resin and isocyanate components are separate streams when exiting the nozzle of the sprayer and mix prior to coating the substrate. In other embodiments, the resin and isocyanate components are premixed prior to leaving the nozzle of the sprayer.

The elastomeric composition of the present invention is ideal for protection of metal pipes against corrosion and abrasion. In particular, the elastomeric composition of the present invention is ideal for protection of steel water pipes for use in the water supply industry, in that the elastomeric coating composition formed in accordance with the embodiments of the present invention and applied to an interior and exterior of a steel water pipe satisfies the requirements AWWA C222 for elastomeric coating used on steel pipes and fittings for the water supply industry.

Thus, for example, as shown in FIG. 1, the elastomeric composition of the present invention may be applied as an elastomeric coating layer 22 on the interior surface 24 and/or the exterior surface 26 of a metal pipe 20. Typically, the elastomeric composition of the coating layers 22 substantially or fully cures after application to the interior 24 and/or exterior surface after application to form substantially tack free surfaces. Any residual NCO content, as noted above, in the elastomeric coating composition may react with residual moisture in the environment of the metal pipe 20 to further cure the respective elastomeric layers 22.

In particular, the elastomeric coating composition of the present invention, when applied to the prepared surface of the steel pipe in accordance with Sections 4.3 and 4.4 of AWWA C222, forms elastomeric coating layers on the steel pipes that satisfies the AWWA C222 standards as set forth in Section 4.2 for cathodic disbondment (maximum disbondment radius of 12 mm as determined in accordance with ASTM G95), flexibility (no cracking or delamination in a flexibility 180° bend over a 77 mm mandrel in accordance with ASTM D522), impact resistance (a minimum of 8.5 Nm (newton meters) in accordance with ASTM G14), abrasion resistance (maximum of 100-mg coating loss per 1000 revolutions using CS17 wheel in accordance with ASTM D4060), chemical resistance (no more than a 5% loss of total mass of the length or width after 30 days immersion in each of the reagents in accordance with ASTM D543 Practice A, Procedure 1), dielectric strength (minimum of 250V/mil in accordance with ASTM D149 (at 20 mil)), water absorption (maximum water absorption of 2.0 percent as determined by ASTM D570), pull off adhesion (greater than 1500 psi (10,342 Kilopascals) in accordance with ASTM D4541) and hardness (minimum Durometer hardness of 65 on Shore D scale in accordance with ASTM D2240).

The following examples are intended to illustrate the invention and are not to be viewed in any way as limiting to the scope of the invention.

Examples

One example of the isocyanate-reactive component and isocyanate component of the system is illustrated in Table 1 below with all values in parts by weight (pbw) based on 100 parts by weight of system and expressed in weight percent, based on the total weight percent of the system.

TABLE 1

System for Forming Elastomeric Composition

| Raw Material | Wt. % of System | Wt % Range of System | Hydroxyl # or Amine # | MW (Weight Avg.) |
|---|---|---|---|---|
| Castor Oil (Purified) | 29.33 | 25-37 | 162 | 935 |
| Polyether Polyol[1] | 2.50 | 1.8-5.0 | 390 | 569 |
| Polyetheramine[2] | 7.49 | 4.0-10.0 | 56.1 | 2000 |
| Polytetramethylene ether glycol[3] | 7.49 | 4.0-10.0 | 112 | 1000 |
| Triethylphosphate | 0.62 | 0.0-2.0 | 0 | 0 |
| Fumed Silica[4] | 1.25 | 0.0-2.5 | 0 | 0 |
| Polyaminopolyol[5] | 7.49 | 4.0-10.0 | 767 | 293 |
| Amine Catalyst[6] | 1.06 | 0.0-1.5 | 561 | 0 |
| Molecular Sieve | 1.25 | 0.0-2.5 | 0 | 0 |
| Tin catalyst[7] | 0.19 | 0.0-0.3 | 0 | 0 |
| Color Pigment[8] | 0.62 | 0.0-2.0 | 28 | 0 |
| Amine Catalyst[9] | 3.12 | 2.5-5.0 | 630 | 178 |
| Polymeric Isocyanate[10] | 37.60 | 35.5-40.0 | | |
| | 100.00 | | | |
| Index (Ratio of NCO/OH) | 1.03 | 1.00-1.10 | | |

[1]Pluracol P-736;
[2]Polyetheramine D-2000;
[3]PolyTHF ® Polyether Diol 1000;
[4]Aerosil ® R-972, available from Evonik Specialty Chemicals;
[5]Quadrol;
[6]Lupragen N201, available from BASF Corporation;
[7]Dabco T-12 Catalyst, available from Air Products and Chemicals, Inc.;
[8]Bright White 18361, available from Repi, S.p.A;
[9]Ethacure 100, available from Albemarle;
[10]Elastoflex R23000T, commercially available from BASF Corporation.

The components of Table 1 were mixed and applied as an elastomeric composition at a theoretical coverage rate of 38.9 ft²/gal (3.61 m²/3.79 liters, or 0.95 m²/liter) a thickness of 35 mils onto a variety of substrates according to the following surface preparation, material preparation, application equipment and guidelines (including 1/16 inch (0.16 cm) galvanized steel substrate panels available from ACT in Hillsdale, Mich.; ¼ inch (0.64 cm) carbon steel plates available from Lake Shore Service, Inc. in Wyandotte, Mich.; schedule 40 pipe sections, measuring 12 inches (30.48 cm) in length with a 2 inch (5.08 cm) inside diameter and 2⅜" (6.03 cm) outside diameter available from KTA-Tator, Inc. in Pittsburgh, Pa.; and high density polyethylene sheets ⅜ inch (0.95 cm) thick available from Grainger in Romulus, Mich.), as summarized below. The panels were air dried for seven days under ambient conditions prior to evaluation.

Surface Preparation:
All parts were visually inspected before blast cleaning.
Any rough welds or sharp projections were ground smooth.
Any deposits of oil, grease or other organic contaminates were removed by using a solvent wash.
All surfaces to be coated were completely dry, free of moisture, dust, grit, oil, grease or any other contaminants in accordance with SSPC-SP1.
The temperature of the substrate was at least 5° F. (3° C.) above the dew point temperature.
A near-white blast, SSPC-SP10/NACE No. 2 and 3-4 mil profile was utilized. The blast medium was clean, dust-free, hard, sharp and angular.
Cleaned surfaces were air blasted, brushed off or vacuumed to remove all dust and debris prior to coating and were coated before any rust blooming occurs. Any cleaned steel showing rust stains was re-blasted prior to coating.

Material Preparation:
Prior to use, each of the resin materials was agitated, via an approved mixer, in its original container for no less than 30 minutes prior to use.
Opened drums of resin and isocyanate were protected from moisture contamination.

Application Equipment and Guidelines:
The elastomeric coating composition was applied by a 2:1 by volume, plural component, high-pressure metering machine. The machine maintained component temperatures of at least 150° F. (66° C.) at the spray gun, as well as operating pressures up to 3000 psi. An impingement mix, airless spray gun with changeable spray tips, which allow for the optimization of the spray pattern, was utilized to apply the elastomeric composition.
Machine: GlasCraft MHR-VR
Spray gun: GlasCraft Probler 2
Mix Chamber: 01
Fan Tip: 36/40
Mix Ratio—Parts by Volume: 200 Resin to 100 Isocyanate
Component Temperatures: 150° F. (66° C.) Resin/Isocyanate
Component Pressures: 2,000 psi (13790 Kilopascals) Resin/2,100 psi (14479 Kilopascals) Isocyanate The elastomeric composition prepared on the appropriate substrate was evaluated for cathodic disbondment, pull-off adhesion, flexibility, impact resistance, abrasion resistance, water absorption, hardness, chemical resistance, dielectric strength and tensile strength generally in accordance with the testing procedure detailed in AWWA C222, with each of the tests further summarized below and the results of those tests summarized in Table 2 that follows.

Cathodic Disbondment
Cathodic disbondment testing of the coated panels was performed in accordance with a modified version of ASTM G-95-07(13), entitled "Standard Test Method for Cathodic Disbondment Test of Pipeline Coatings (Attached Cell Method)", at ambient test conditions (approximately 23° C.) on the galvanized steel substrate panels as provided above. Modifications included the applied voltage and the duration of the test period. Coating thickness measurements were obtained on the samples using a DeFelsko PosiTector® 6000 non-destructive electronic coating thickness gage.

The procedure for testing the samples included drilling a ⅛ inch (0.3173 cm) diameter holiday through the coating to the metal surface at the center of the coated steel panel designated for cathodic bond testing. A pipe section with a 4 inch (10.16 cm) diameter was adhered to each panel with a silicone adhesive such that the holiday site was within the inner diameter of the pipe. The interior of the pipe (i.e., the cell) was filled with an electrolyte solution (3% by mass sodium chloride in deionized water) such that the holiday site was immersed in the electrolyte solution. A platinum wire was used as the impressed current anode, and a −1.5V potential was impressed upon the samples for 28 days.

After 28 days, coating adhesion was assessed at the formerly immersed holiday site and at one non-immersed site on the coated panel by cutting a 45° radial cut in the shape of an "X" through the coating to the substrate and manually peeling back the coating with a utility blade knife to determine the extent of adhesion loss. The amount of coating disbondment was measured from the original holiday site to the furthest point of the exposed substrate.

Once the coating was removed, a visual observation of staining was observed on the surface of the steel panel corresponding to the formerly immersed holiday site. The staining was visually evident at a distinct circle around the formerly immersed holiday site. This circle was measured and correlated to the amount of cathodic disbondment due to the cathodic disbondment test. The amount of staining was measured from the original holiday site to the further radial point of staining. The test was repeated for numerous samples and the average radial staining is summarized in Table 2 below.

Pull Off Adhesion
Pull-off adhesion was evaluated in accordance with ASTM D4541, entitled "Pull-Off Strength of Coatings Using Portable Adhesion Testers, Test Method E, 'Self Aligning Adhesion Tester Type V.'"

Pull off adhesion was performed on coated 4 inch×8 inch×0.25 inch (10.16 cm×20.32 cm×0.635 cm) steel plates that were prepared according to the surface preparation listed above. Coating thicknesses were determined on five spots on the respective panels using a DeFelsko PosiTector® 6000 non-destructive electronic coating thickness gage. The testing surfaces were abraded with 60 grit sandpaper and wiped clean. 20 mm diameter dollies (whose surfaces were abraded with 80 grit sandpaper) were attached to the abraded sample surface using a cyanoacrylate or two-component epoxy glue, which was allowed to dry 24 hours before at ambient laboratory conditions before being pulled. The sample surface was scored around the pull stub to the metal surface before being pulled using a DeFelsko PosiTest AT-A Automatic Adhesion Tester.

Flexibility
Flexibility testing was performed in accordance with ASTM D522/D522M-13, "Standard Test Methods for Mandrel Bend Test of Attached Organic Coatings," Method B. The test panels were cold rolled steel 1/32 inch×4 inch×12 inch, (0.081 cm×10.16 cm×30.5 cm)—ACT CRS 04×12× 026 B1000 P99X DIW; UNP and the coating was applied by the method described above. Coating thickness measurements were obtained on the samples using a DeFelsko PosiTector® 6000 non-destructive electronic coating thickness gage.

In this test, each sample was bent 180° over a 3 inch (7.62 cm) mandrel and then examined with an 8× comparator lens for cracking. The test was repeated for numerous samples and results are summarized in Table 2 below.

Impact Resistance

The impact resistance of the coating on the coated substrate was determined in accordance with ASTM G14-04 (10)e1, entitled "Standard Test Method for Impact Resistance of Pipeline Coatings (Falling Weight Test)." In this test, five pipe sections measuring 12 inches in length (30.48 cm) were coated in a manner as described above. Coating thicknesses were determined on five spots on the respective panels using a DeFelsko PosiTector® 6000 non-destructive electronic coating thickness gage. The pipe was secured to the apparatus outlined in the method, and a 3.2 pound (1.45 kg) tup weight (falling weight) was dropped from various heights ranging from 24 to 48 inches (60.96 to 121.92 cm) as outlined in the method. Twenty impact locations were observed on each pipe section and the impact strength was calculated by employing height, weight, and frequency of coating failure data. The results are summarized in Table 2 below.

Abrasion Resistance

Taber abrasions resistance was determined in accordance with ASTM D4060-14, entitled "Standard Test Method for Abrasion Resistance of Organic Coatings by the Taber Abraser." Duplicate 1/32 inch by 4 inch by 4 inch coated cold rolled steel panels (0.081 cm by 10.16 cm by 10.16 cm) (ACT CRS 04×12×026 B1000 P99X DIW; UNP panels) were weighed and then subjected to 1000 cycles using a 1000 gram load and Cs-17 abrasion wheels. Coating thicknesses were determined on five spots on the respective panels using a DeFelsko PosiTector® 6000 non-destructive electronic coating thickness gage. Post abrasion weights were acquired after the 100 cycle test, and the weight loss in milligrams recorded. The test was repeated for numerous samples and results are summarized in Table 2 below.

Water Absorption

The water absorption of free film samples was measured in accordance with ASTM D570-98(10)e1, entitled "Standard Test Method for Water Absorption of Plastics" with Procedure 7.4, "Long Term Immersion." In this test, coatings were applied to high density polyethylene (HDPE) sheets (at least 3/8 inch (at least 0.95 cm) thick) in accordance with the surface preparation, material preparation, application equipment, and application guidelines described above (replacing the steel substrates with the HDPE panels). Three bars measuring 3 inches by 1 inch (7.72 cm by 2.54 cm) were cut from the free film removed from the HDPE sheets and the thickness of each bar was measured using Mitutoyo Digimatic Calipers. The samples were conditioned in an oven maintained at 50° C. for 24 hours. After conditioning, the samples were cooled in a dessicator and immediately weighed. The samples were then submerged in deionized water maintained at laboratory conditions of about 70° F. (about 21° C.) at 50% relative humidity. The samples were removed from the water after 24 hours, one week and two weeks thereafter and reweighed. The percent increase in weight was then calculated according to the formula: [% increase in weight=(wet weight−conditioned weight)/conditioned weight) times 100%].

Shore D Hardness

The hardness of the coating was evaluated in accordance with ASTM D2240-05(10), "Standard Test Method for Rubber Property—Durometer Hardness." Using a Shore D durometer (verified using calibrated hardness blocks), five readings were obtained from the free film sample removed from 3/8 inch (0.95 cm) thick high density polyethylene sheets (prepared in accordance with the method as described in the water absorption test above). The average result is summarized in Table 2 below.

Chemical Resistance

Chemical resistance was assessed in accordance with AWWA C222-08, "Polyurethane Coatings for the Interior and Exterior of Steel Water and Pipe Fittings," which references ASTM D543-14, "Standard Practices for Evaluating the Resistance of Plastics to Chemical Reagents." The chemical solutions used for this test included 10% sodium chloride, 30% sodium chloride, 30% sodium hydroxide, No. 2 diesel fuel, and deionized water. The average changes in mass and dimensions of three replicate coated panels were calculated after 30 days of immersion at ambient temperature (about 23° C.). Coating dimension measurements were obtained on five sports of each respective sample using Mitutoyo Digimatic Calipers. The test was repeated for numerous samples and results are summarized in Table 2 below.

Dielectric Strength

Dielectric strength testing was conducted in accordance with ASTM D199-09(13), "Standard Test Method for Dielectric Breakdown Voltage and Dielectric Strength of Solid Electrical Insulating Materials at Commercial Power Frequencies," Method A. The average result of testing upon numerous sample panels is summarized in Table 2 below.

Tensile Strength

Tensile strength of the coatings was evaluated in accordance with ASTM D638 type IV, entitled "Standard Test Method for Tensile Properties of Plastics". In this test, samples were obtained from the free film sample removed from 3/8 inch (0.95 cm) thick high density polyethylene sheets (coated sheets were prepared in accordance with the method described in the water absorption section above). ASTM D638 Type IV specimens were died out with a hydraulic cutting press, and thickness measured with a mechanical thickness gauge. Samples were pre-conditioned for a minimum of 24 hours at standard ambient conditions of 23° C. and 50% RH (relative humidity). All testing was conducted at the same standard ambient conditions, on an MTS universal testing machine, using Testworks 4 software.

Results

The results from the testing for cathodic disbondment, pull-off adhesion, flexibility, impact resistance, abrasion resistance, water absorption, hardness, chemical resistance, dielectric strength and tensile strength performed in accordance with the methods described above is provided in Table 2 below.

TABLE 2

Evaluation of Elastomeric Coating Composition (AWWA C222 Standard)

| Test Procedure | Standard | Results |
| --- | --- | --- |
| Cathodic Disbondment | Maximum of 12 mm radial staining | Less than 2 mm average radial staining |
| Pull Off Adhesion | ASTM D4541 | >1500 psi (>10,342 Kilopascals) |
| Flexibility | No cracking or delamination in a flexibility 180° bend over a 77 mm mandrel in accordance with ASTM D522 | Pass |
| Impact Resistance | A minimum of 8.5 newton meters (75.2 in-lb) in accordance with ASTM G14 | 9.94 newton meters (88 in-lb) |
| Abrasion Resistance | Maximum of 100 mg coating loss per 1000 revolutions using CS17 wheel in accordance with ASTM D4060 | 25.1 mg loss |
| Water Absorption | Maximum water absorption of 2.0 percent as determined by ASTM D570 | <2.0% |
| Shore D Hardness | Minimum Durometer hardness of 65 on Shore D scale in accordance with ASTM D2240 | 70 |
| Chemical Resistance | No more than a 5% loss of total mass of the length or width after 30 days immersion in each of the reagents in accordance with ASTM D543 Practice A, Procedure 1 | Pass |
| Dielectric Strength | Minimum of 250 V/mil in accordance with ASTM D149 (at 20 mil) | Pass - (716 V/mil) |
| Tensile Strength | Method performed in accordance with ASTM ASTM D638 type IV - no standard | 3400 psi (23442 Kilopascals) |

It is to be understood that the appended claims are not limited to express and particular compounds, surface treatment materials, or methods described in the detailed description, which may vary between particular embodiments which fall within the scope of the appended claims. With respect to any Markush groups relied upon herein for describing particular features or aspects of various embodiments, different, special, and/or unexpected results may be obtained from each member of the respective Markush group independent from all other Markush members. Each member of a Markush group may be relied upon individually and or in combination and provides adequate support for specific embodiments within the scope of the appended claims.

Further, any ranges and subranges relied upon in describing various embodiments of the present invention independently and collectively fall within the scope of the appended claims, and are understood to describe and contemplate all ranges including whole and/or fractional values therein, even if such values are not expressly written herein. One of skill in the art readily recognizes that the enumerated ranges and subranges sufficiently describe and enable various embodiments of the present invention, and such ranges and subranges may be further delineated into relevant halves, thirds, quarters, fifths, and so on. As just one example, a range "of from 0.1 to 0.9" may be further delineated into a lower third, i.e., from 0.1 to 0.3, a middle third, i.e., from 0.4 to 0.6, and an upper third, i.e., from 0.7 to 0.9, which individually and collectively are within the scope of the appended claims, and may be relied upon individually and/or collectively and provide adequate support for specific embodiments within the scope of the appended claims. In addition, with respect to the language which defines or modifies a range, such as "at least," "greater than," "less than," "no more than," and the like, it is to be understood that such language includes subranges and/or an upper or lower limit. As another example, a range of "at least 10" inherently includes a subrange of from at least 10 to 35, a subrange of from at least 10 to 25, a subrange of from 25 to 35, and so on, and each subrange may be relied upon individually and/or collectively and provides adequate support for specific embodiments within the scope of the appended claims. Finally, an individual number within a disclosed range may be relied upon and provides adequate support for specific embodiments within the scope of the appended claims. For example, a range "of from 1 to 9" includes various individual integers, such as 3, as well as individual numbers including a decimal point (or fraction), such as 4.1, which may be relied upon and provide adequate support for specific embodiments within the scope of the appended claims.

The invention has been described in an illustrative manner, and it is to be understood that the terminology which has been used is intended to be in the nature of words of description rather than of limitation. Obviously, many modifications and variations of the present invention are possible in light of the above teachings. The invention may be practiced otherwise than as specifically described.

What is claimed is:

1. A system for forming an elastomeric composition for application to a substrate, the system comprising:
    an isocyanate component comprising a polymeric polyisocyanate, said isocyanate component comprising from 35.5 to 40 weight percent of the total weight of said system; and
    an isocyanate-reactive component comprising a polyol component and a polyetheramine, said polyol component comprising a mixture of:
    (a) a hydrophobic polyol;
    (b) a polyether polyol different than said hydrophobic polyol, said polyether polyol having a weight average molecular weight greater than 500 g/mol; and
    (c) a polyaminopolyol.

2. The system according to claim 1, wherein said polymeric polyisocyanate comprises polymeric diphenylmethane diisocyanate.

3. The system according to claim 1, wherein said isocyanate component further comprises an isocyanate-terminated prepolymer present in said isocyanate component in an amount from about 25 to about 75 parts based on 100 parts by weight of said isocyanate component.

4. The system according to claim 1, wherein said hydrophobic polyol comprises a natural oil polyol.

5. The system according to claim 4, wherein the natural oil polyol comprises castor oil.

6. The system according to claim 1, wherein said polyether polyol has a weight average molecular weight of from 500 to 650 g/mol.

7. The system according to claim 6, wherein said polyether polyol is derived from the catalyzed addition reaction of propylene oxide in the absence of ethylene oxide.

8. The system according to claim 6, wherein said polyether polyol has an average functionality of from 3.5 to 4.0.

9. The system according to claim 6, wherein said polyether polyol comprises from 1.8 to 5 weight percent of the total weight of said system.

10. The system according to claim 1, wherein said isocyanate-reactive component further comprises polytetramethylene ether glycol obtained by the polymerization of tetrahydrofuran.

11. The system according to claim 10, wherein said polytetramethylene ether glycol comprises from 4 to 10 weight percent of the total weight of said system.

12. The system according to claim 1, wherein said isocyanate-reactive component further comprises polytetramethylene ether glycol obtained by the polymerization of tetrahydrofuran and having a weight average molecular weight of from 650 to 2000 g/mol.

13. The system according to claim 1, wherein said polyaminopolyol comprises ethylene diamine and propylene oxide based polyether polyol tetrol.

14. The system according to claim 1, wherein said polyaminopolyol comprises from 4 to 10 weight percent of the total weight of said system.

15. The system according to claim 1, wherein said polyetheramine comprises from 4 to 10 weight percent of the total weight of said system.

16. The system according to claim 1 comprising, based on 100 parts by weight of said system:
   35.5 to 40 parts by weight of said isocyanate component;
   25 to 37 parts by weight of castor oil as said hydrophobic polyol;
   1.8 to 5 parts by weight of a polyether polyol derived from the catalyzed addition reaction of propylene oxide, said polyether polyol having a weight average molecular weight of from 500 to 650 and an average functionality from 3.5 to 4.0; and
   4 to 10 parts by weight of polytetramethylene ether glycol obtained by the polymerization of tetrahydrofuran and having a weight average molecular weight of from 650 to 2000 g/mol;
   4 to 10 parts by weight of said polyaminopolyol; and
   4 to 10 parts by weight of said polyetheramine.

17. The system according to claim 1, wherein the molar ratio of NCO groups in said isocyanate component to active hydrogens in said isocyanate-reactive component is from 1:1 to 1.10:1.

18. An elastomeric composition obtained by reacting said isocyanate component with said isocyanate-reactive component of said system according to claim 1.

19. An article comprising a substrate and an elastomeric coating layer adhered thereon, said elastomeric coating layer comprising an elastomeric composition according to claim 18.

20. The article according to claim 19, wherein said substrate comprises a metal pipe having an exterior surface and an interior surface, and wherein said elastomeric coating composition is applied to at least one of said exterior surface and said interior surface to form an elastomeric coating layer adhered thereon, and wherein said steel pipe having said applied elastomeric coating layer satisfies the standard for use in the water supply industry as set forth in AWWA C222.

21. A process of coating a substrate comprising applying a layer of said elastomeric composition according to claim 18 onto a surface of the substrate to form an elastomeric coating layer.

22. A process of forming an elastomeric composition comprising:
   mixing together said isocyanate component with said isocyanate-reactive component of said system according to claim 1; and
   reacting said isocyanate component with said isocyanate-reactive component to form the elastomeric composition.

23. A system for forming an elastomeric composition for application to a substrate, the system comprising based on 100 parts by weight of said system:
   35.5 to 40 parts by weight of an isocyanate component comprising a polymeric polyisocyanate; and
   an isocyanate-reactive component comprising a polyol component and 4 to 10 parts by weight of a polyetheramine based on 100 parts by weight of said isocyanate-reactive component, said polyol component comprising a mixture of:
   (a) 25 to 37 parts by weight of a hydrophobic polyol which is castor oil;
   (b) 1.8 to 5 parts by weight of a polyether polyol derived from a catalyzed addition reaction of propylene oxide, said polyether polyol having a weight average molecular weight of from 500 to 650 and an average functionality of from 3.5 to 4.0;
   (c) 4 to 10 parts by weight of a polyaminopolyol; and
   (d) 4 to 10 parts by weight of polytetramethylene ether glycol obtained by the polymerization of tetrahydrofuran and having a weight average molecular weight of from 650 to 2000 g/mol.

24. A system for forming an elastomeric composition for application to a substrate, the system comprising:
   an isocyanate component comprising a polymeric polyisocyanate and an isocyanate-terminated prepolymer wherein said isocyanate-terminated prepolymer is present in said isocyanate component in an amount of from about 25 to about 75 parts by weight based on 100 parts by weight of said isocyanate component; and
   an isocyanate-reactive component comprising a polyol component and a polyetheramine, said polyol component comprising a mixture of:
   (a) a hydrophobic polyol;
   (b) a polyether polyol different that said hydrophobic polyol, said polyether polyol having a weight average molecular weight of greater than 500 g/mol; and
   (c) a polyaminopolyol.

25. A system for forming an elastomeric composition for application to a substrate, the system comprising:
   an isocyanate component comprising a polymeric polyisocyanate; and
   an isocyanate-reactive component comprising a polyol component and a polyetheramine, said polyol component comprising a mixture of:
   (a) a hydrophobic polyol;
   (b) a polyether polyol different than said hydrophobic polyol, said polyether polyol having a weight average molecular weight of greater than 500 g/mol;
   (c) a polyaminopolyol; and
   (d) a polytetramethylene ether glycol obtained by the polymerization of tetrahydrofuran, said polytetramethylene ether glycol comprising from 4 to 10 weight percent of the total weight of said system.

* * * * *